United States Patent
Song et al.

(10) Patent No.: US 6,937,388 B2
(45) Date of Patent: Aug. 30, 2005

(54) L-BAND OPTICAL AMPLIFIER

(75) Inventors: Kwan-Woong Song, Songnam-shi (KR); Seong-Taek Hwang, Pyongtaek-shi (KR); Yun-Je Oh, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 10/425,698

(22) Filed: Apr. 29, 2003

(65) Prior Publication Data

US 2004/0109226 A1 Jun. 10, 2004

(30) Foreign Application Priority Data

Dec. 10, 2002 (KR) ................................. 10-2002-0078120

(51) Int. Cl.[7] .................................................. H01S 3/00
(52) U.S. Cl. ..................................... 359/341.1; 359/347
(58) Field of Search ................................. 359/347, 333, 359/341.1

(56) References Cited

U.S. PATENT DOCUMENTS

| | | | |
|---|---|---|---|
| 6,404,539 B1 * | 6/2002 | Kotrotsios et al. | 359/341.1 |
| 6,501,873 B1 * | 12/2002 | Moon et al. | 385/27 |
| 6,570,701 B1 * | 5/2003 | Hwang et al. | 359/341.1 |
| 6,731,426 B2 * | 5/2004 | Yeniay et al. | 359/341.32 |
| 6,867,910 B2 * | 3/2005 | Takei et al. | 359/341.1 |

FOREIGN PATENT DOCUMENTS

JP           2004193613 A *  7/2004  ........... H01S/3/091

* cited by examiner

*Primary Examiner*—Mark Hellner
(74) *Attorney, Agent, or Firm*—Cha & Reiter, L.L.C.

(57) ABSTRACT

Disclosed is an L-band optical amplifier for amplifying optical signals with the wavelength band of the L-band. The L-band optical amplifier comprises an optical-amplifying section for emitting spontaneous emission and for amplifying the optical signals by pumping of the spontaneous emission, a mirror for reflecting the optical signals amplified by the optical-amplifying section to re-enter back to the optical-amplifying section, and a feedback loop connected with both terminals of the optical-amplifying section for causing spontaneous emission emitted from the optical-amplifying section to be fed back to the optical-amplifying section.

13 Claims, 6 Drawing Sheets

L-BAND OPTICAL AMPLIFIER

CLAIM OF PRIORITY

This application claims priority to an application entitled "L-Band Optical Amplifier," filed in the Korean Intellectual Property Office on Dec. 10, 2002 and assigned Ser. No. 2002-78120, the contents of which are hereby incorporated by reference.

BACKGROUND OF THE INVENTION

1. Field of the Invention

The present invention relates to an L-band optical amplifier for amplifying optical signals with the wavelength band of the L-band using an erbium-doped fiber. More particularly, the present invention is directed to an L-band optical amplifier for amplifying the L-band wavelength by pumping an erbium-doped fiber by means of spontaneous emission.

2. Description of the Related Art

Optical amplifiers have been typically used in an optical communication system to compensate optical signal loss from a long-distance transmission. In particular, erbium-doped fiber amplifiers (EDFAs) have been widely used owing to its excellent amplification efficiency and low noise generation. For example, the wavelength band of the C-band ranging from 1530 nm to 1565 nm is generally used.

FIG. 1 shows a conventional C-band optical amplifier for amplifying optical signals in the wavelength band of the C-band. As shown in FIG. 1, the C-band optical amplifier includes a first pumping light source 130, a second pumping light source 160, a first wavelength selective coupler 120, a second wavelength selective coupler 150, a first isolator 110, a second isolator 170, and an erbium-doped fiber 140.

Each of the first and second pumping light sources 130 and 160 may be constructed by using a laser diode, which outputs light at a wavelength of 980 nm or 1480 nm. In order to pump the erbium-doped fiber 140, the first pumping light source 130 outputs the first pump light in a forward direction and the second pumping light source 160 outputs the second pump light in a backward direction.

The first wavelength selective coupler 120 is interposed between the first isolator 110 and the erbium-doped fiber 140 and inputs the first pump light and the optical signals inputted from the first isolator 110 into the erbium-doped fiber 140.

The second wavelength selective coupler 150 is interposed between the second isolator 170 and the erbium-doped fiber 140, inputs the second pump light into the erbium-doped fiber 140, and outputs the optical signals amplified at the erbium-doped fiber 140 to the second isolator 170.

The erbium-doped fiber 140 is interposed between the first wavelength selective coupler 120 and the second wavelength selective coupler 150 and is pumped by the first and second pump light outputted from the first and second pumping light sources 130 and 160 to amplify optical signals belonging to the C-band.

The first isolator 110 serves to minimize a loss caused by optical signals traveling in a reverse direction. The first isolator 110 allows optical signals belonging to the C-band received from an exterior source to pass through but prevents optical signals inputted from the first wavelength selective coupler 120 to pass through in a reverse direction.

The second isolator 170 transmits optical signals outputted from the second wavelength selective coupler 150 but prevents backward optical signals inputted from an exterior source back to the inside of the C-band optical amplifier.

In order to effectively cope with a recent rapid growth in communication demand, various approaches for using a plurality of wavelength bands, such as the C-band between 1530 nm and 1565 nm, the L-band between 1565 nm and 1610 nm, and the S-band between 1450 nm to 1510 nm are being developed.

FIG. 2 shows a configuration of an L-band optical amplifier using a pumping light source with the wavelength band of the C-band according to the prior art. As shown in FIG. 2, the L-band optical amplifier includes a first isolator 210 and a second isolator 250, an erbium-doped fiber 240, a wavelength selective coupler 220, and a pumping light source 230. Note that the L-band optical amplifier amplifies optical signals with the wavelength band of the L-band by means of pump light with the wavelength band of the C-band.

The first isolator 210 causes optical signals with the wavelength band of the L-band received from an exterior source to be forwarded to the wavelength selective coupler 220 but prevents backward optical signals from the wavelength selective coupler 220.

The pumping light source 230 may be constructed by using a laser diode generating light at a wavelength of 1550 nm. The pumping light source 230 emits pump light belonging to the wavelength band of the C-band to pump the erbium-doped fiber 240.

The erbium-doped fiber 240 is pumped by the pump light and amplifies the optical signals by stimulated emission of a wavelength of light, such as inputted optical signals with the wavelength band of the L-band.

The wavelength selective coupler 220 is interposed between the erbium-doped fiber 240 and the second isolator 250 and serves to input the pump light and the optical signals with the wavelength band of the L-band into the erbium-doped fiber 240.

The second isolator 250 causes the optical signals inputted from the erbium-doped fiber 240 to be forwarded to the outside of the L-band optical amplifier but prevents optical signals inputted from the exterior source back to the L-band optical amplifier.

FIG. 3 shows a configuration of a conventional L-band optical amplifier using a C-band optical amplifier as a pumping light source. As shown in FIG. 3, the L-band optical amplifier includes a C-band optical amplifier 330, a wavelength selective coupler 320, a first erbium-doped fiber 340, first and second isolators 310 and 350. Note that the C-band optical amplifier 330 functions as a pumping light source of the L-band optical amplifier.

The C-band optical amplifier 330 includes a C-band light source 331, first and second pumping light sources 334 and 337, a second erbium-doped fiber 335, an tunable filter 338, third and fourth isolators 332 and 339, second and third wavelength selective couplers 333 and 336. As shown, the C-band optical amplifier 330 outputs pump light with the wavelength band of the C-band so as to pump the L-band optical amplifier.

The C-band optical amplifier 330 has the same configuration as that of the C-band optical amplifier shown in FIG. 1. For this reason, the detailed description will be omitted. However, unlike the C-band optical amplifier shown in FIG. 1, the C-band optical amplifier 330 further comprises the light source 331 with the wavelength band of the C-band, thus the C-band optical amplifier 330 functions as the pumping light source for the L-band optical amplifier.

The first wavelength selective coupler 320 allows the pump light of the C-band inputted from the C-band optical amplifier 330 and the optical signals of the L-band inputted from the first isolator 310 to be forwarded into the first erbium-doped fiber 340. The first erbium-doped fiber 340 is pumped by the C-band pump light to amplify optical signals with the wavelength band of the L-band.

The first isolator 310 allows optical signals received from an exterior to be inputted into the first wavelength selective coupler 320 but prevents the backward optical signals inputted from the first wavelength selective coupler 320. Similarly, the second isolator 350 blocks the optical signals traveling in a reverse direction, thus minimizing a loss resulting from the optical signals traveling in a reverse direction.

However, the erbium-doped fiber generally has a lower absorption and emission value at the wavelength band of the L-band, as compared with that at the wavelength band of the C-band. Therefore, when the L-band optical amplifier makes use of a laser diode or a C-band optical amplifier, which has the wavelength band of the C-band, as a pumping light source, the L-band optical amplifier has difficulty in obtaining a higher output power and generating a greater noise figure. Such L-band optical amplifier also tends to increase the production cost. In particular, when the L-band optical amplifier makes use of a C-band optical amplifier as a pumping light source, the L-band optical amplifier must provide a separate light source. This type of arrangement further increases the volume of the amplifier and yields a complicated construction.

SUMMARY OF THE INVENTION

Accordingly, the present invention has been made to solve the above-mentioned problems occurring in the prior art, by providing a compact L-band optical amplifier capable of providing higher pumping and amplification efficiency using a feedback loop for incidenting spontaneous emission into an erbium-doped fiber again.

According to one embodiment of the present invention, there is provided an L-band optical amplifier for amplifying optical signals with the wavelength band of the L-band, comprising: an optical-amplifying section for emitting spontaneous emission and for amplifying the optical signals by pumping of the spontaneous emission; a mirror for reflecting the optical signals amplified by the optical-amplifying section to re-enter the optical amplifying section; and, a feedback loop, connected with both terminals of the optical amplifying section, for causing spontaneous emission emitted from the optical-amplifying section to be fed back to the optical-amplifying section.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention unclear.

An L-band optical amplifier according to the teachings of the present invention includes an optical-amplifying section, a mirror for reflecting primary amplified optical signals, and a feedback loop as an optical path for causing spontaneous emission emitted from the optical-amplifying section to be fed back to the optical-amplifying section.

More specifically, the optical-amplifying section emits spontaneous emission and is pumped by the spontaneous emission to amplify optical signals of the L-band. The mirror reflects optical signals amplified at the optical-amplifying section, then forces the reflected optical signals to re-enter the optical-amplifying section. The feedback loop is connected with both terminals of the optical-amplifying section, thus causing spontaneous emission emitted from the optical-amplifying section to be fed back to the optical-amplifying section.

Accordingly, the feedback loop allows the erbium-doped fiber to function as a pumping light source and at the same time as an amplification medium, while the mirror improves the amplification efficiency. Therefore, the present invention has an advantage, as explained hereinafter, in that the optical amplifier has a simplified structure, improved amplification efficiency, and higher pumping efficiency by minimizing loss of the pumping light source.

Figure 1:
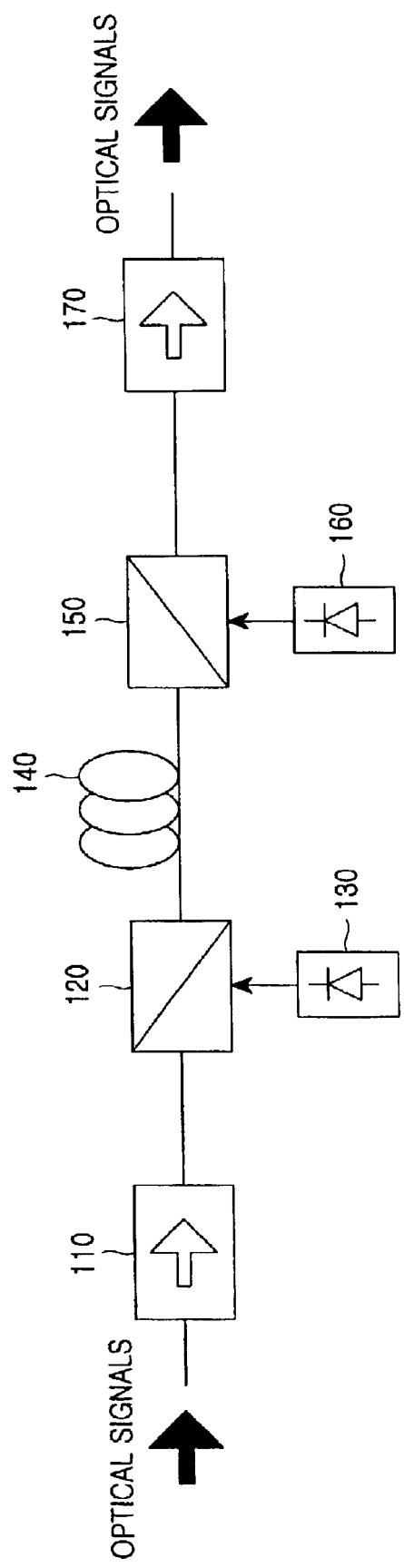
FIG. 1 shows a C-band optical amplifier for amplifying optical signals belonging to the wavelength band of the C-band according to the prior art.
Figure 2:
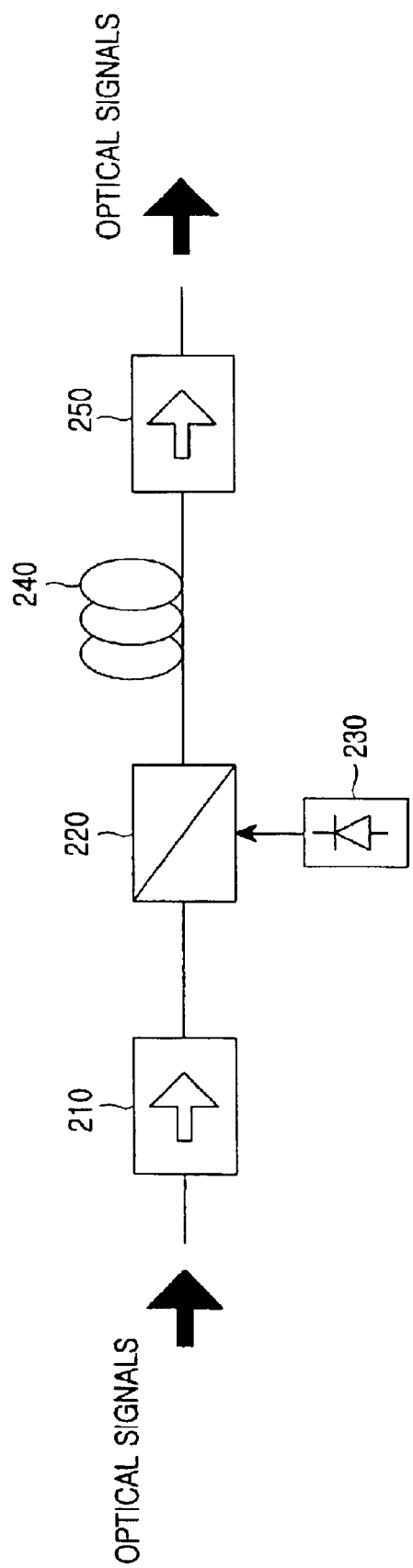
FIG. 2 shows a configuration of an L-band optical amplifier using a pumping light source with the wavelength band of the C-band according to the prior art.
Figure 3:
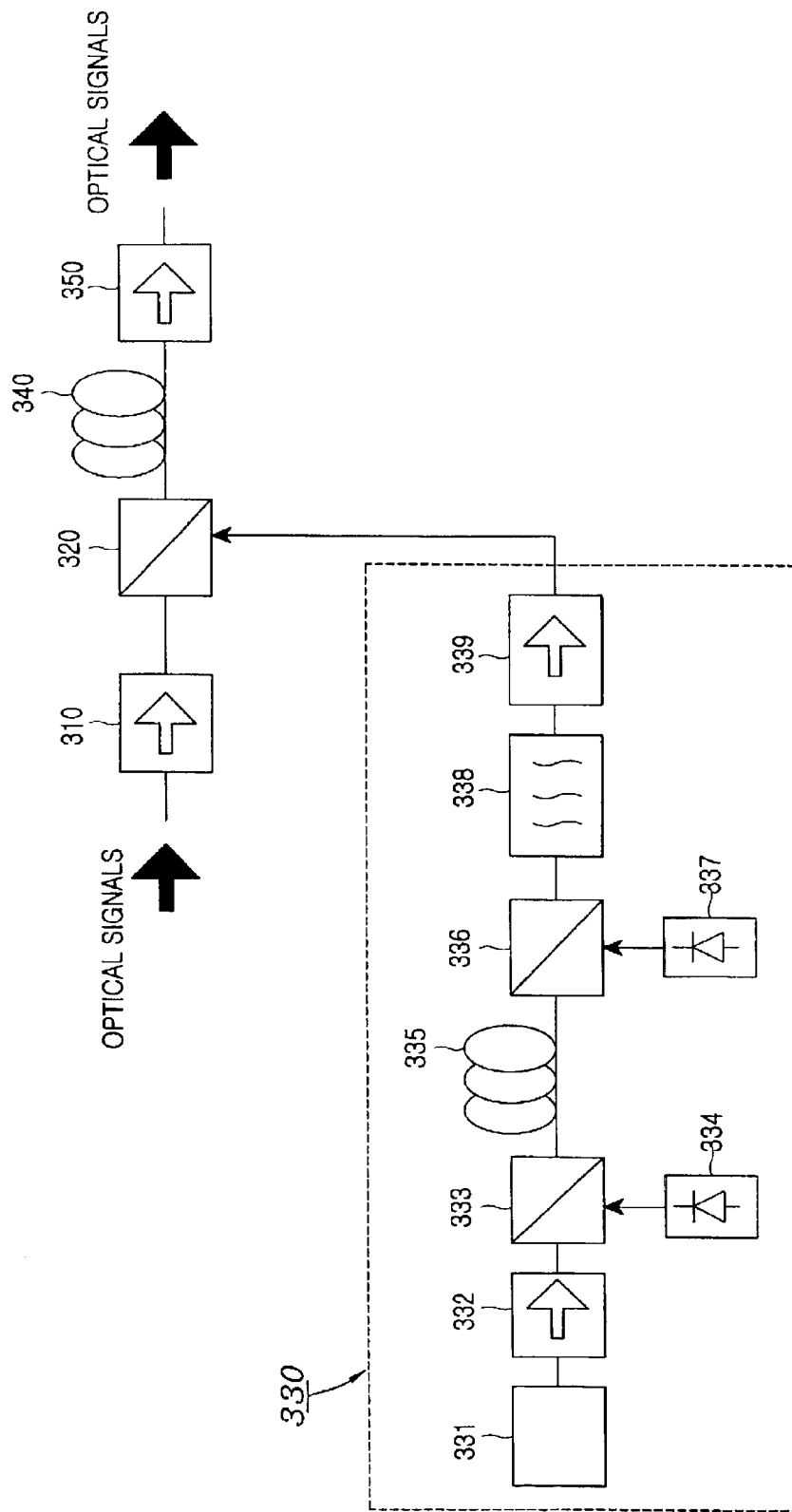
FIG. 3 shows a configuration of an L-band optical amplifier using a C-band optical amplifier as a pumping light source according to the prior art.
Figure 4:
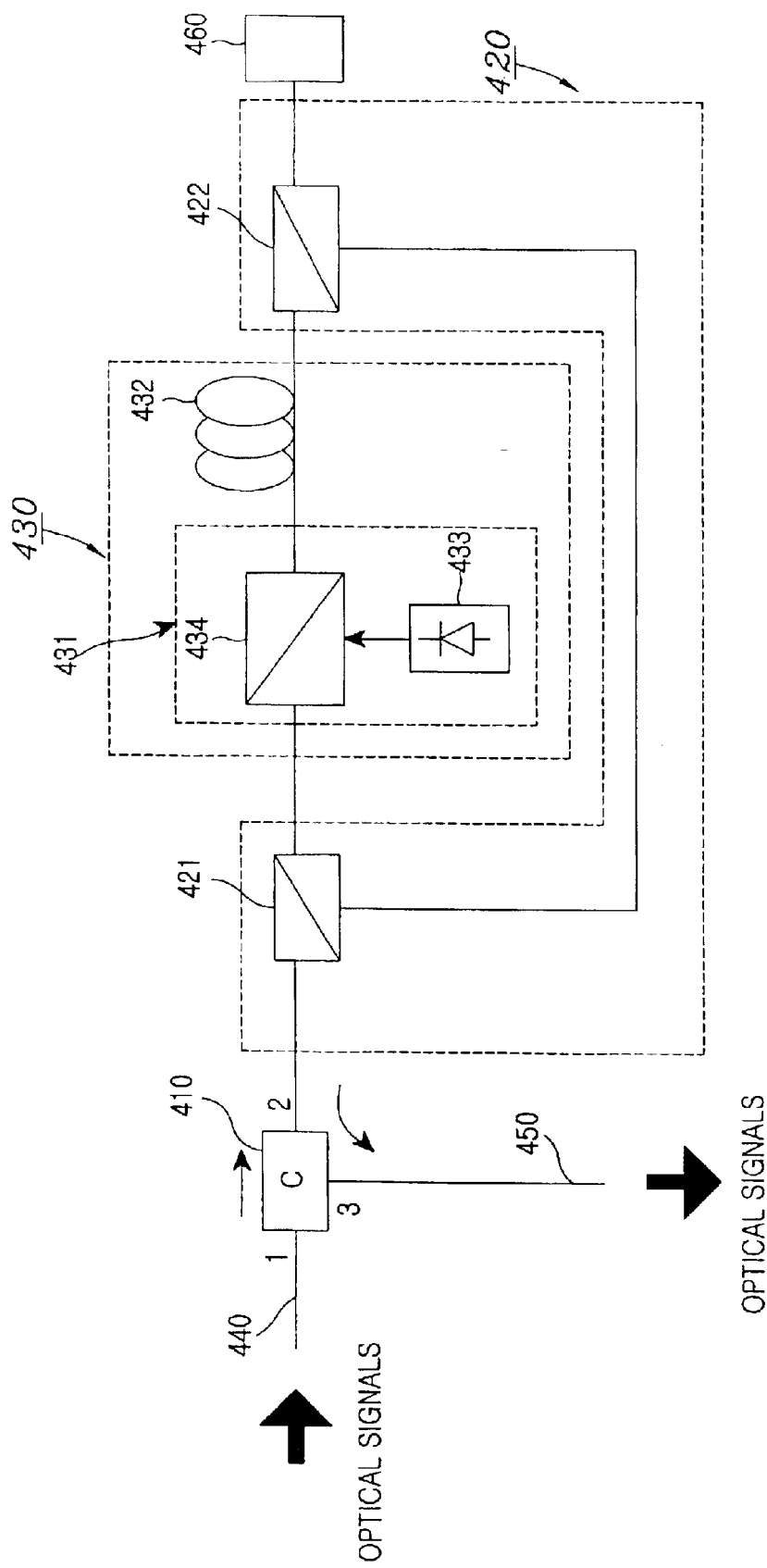
FIG. 4 shows a configuration of an L-band optical amplifier according to a first embodiment of the present invention, in which the L-band optical amplifier includes a feedback loop for spontaneous emission, and a mirror.

FIG. 4 shows a configuration of an L-band optical amplifier according to a first embodiment of the present invention. As shown in FIG. 4, the L-band optical amplifier includes an optical-amplifying section 430, a mirror 460 for reflecting amplified optical signals and for causing the reflected results to re-incident back the optical-amplifying section 430, a feedback loop 420 connected with both terminals of the optical-amplifying section 430 for causing spontaneous emission emitted from the optical-amplifying section 430 to be fed back to the optical-amplifying section 430, and a circulator 410. The circulator 410 includes one port connected with an input terminal 440 into which optical signals with the wavelength band of the L-band are inputted, and another port connected with an output terminal 450 through which amplified optical signals are outputted.

The optical-amplifying section 430 includes an erbium-doped fiber 432 for emitting spontaneous emission and for amplifying optical signals of the L-band, and a pumping means 431 for pumping the erbium-doped fiber 432. The optical-amplifying section 430 is pumped by the spontaneous emission to amplify the optical signals of the L-band. The pumping means 431 comprises a pumping light source 433 and a third wavelength selective coupler 434 so as to pump the erbium-doped fiber 432.

The pumping light source 433 outputs pump light for pumping the erbium-doped fiber 432 and may be constructed by using a laser diode generating light in a wavelength of 980 nm. The third wavelength selective coupler 434 causes the pump light to enter the erbium-doped fiber 432.

The erbium-doped fiber 432 emits spontaneous emission of the C-band after being pumped by the pump light. The erbium-doped fiber 432 is pumped by the spontaneous emission, via the feedback loop 420, to amplify the optical signals of the L-band.

The mirror 460 reflects the L-band optical signals amplified at the erbium-doped fiber 432 to re-enter back to the erbium-doped fiber 432.

The feedback loop 420 comprises a first wavelength selective coupler 421 connected to one end of the erbium-doped fiber 432 and a second wavelength selective coupler 422 connected to the other end of the erbium-doped fiber 432.

The first wavelength selective coupler 421 is connected to one end of the erbium-doped fiber 432, i.e.—to one terminal of the optical-amplifying section 430 including the erbium-doped fiber 432. The second wavelength selective coupler 422 is connected to the other end of the erbium-doped fiber 432. The first and second wavelength selective couplers 421 and 422 form the feedback loop 420 for circulating the spontaneous emission, thus functioning to feed the spontaneous emission emitted from the erbium-doped fiber 432 back to the erbium-doped fiber 432.

The circulator 410 is connected with the input terminal 440 and the output terminal 450 in front of the first wavelength selective coupler 421, thus inputting the L-band optical signals inputted from the input terminal 440 into an interior of the L-band optical amplifier, preferably into the optical-amplifying section 430. At the same time, the circulator 410 outputs optical signals amplified at the interior of the L-band optical amplifier, preferably at the optical-amplifying section 430, to the output terminal 450.

Accordingly, in the L-band optical amplifier, the erbium-doped fiber 432 is pumped by the pumping light source 433 to emit spontaneous emission, the emitted spontaneous emission is fed back to the erbium-doped fiber 432 through the feedback loop 420, and the feedback spontaneous emission functions as the pumping light source for pumping the erbium-doped fiber 432. The erbium-doped fiber 432 amplifies optical signals with the wavelength band of the L-band. The optical signals amplified at the erbium-doped fiber 432 are reflected through the mirror 460, and then they are re-amplified at the erbium-doped fiber 432 again.

Figure 5:
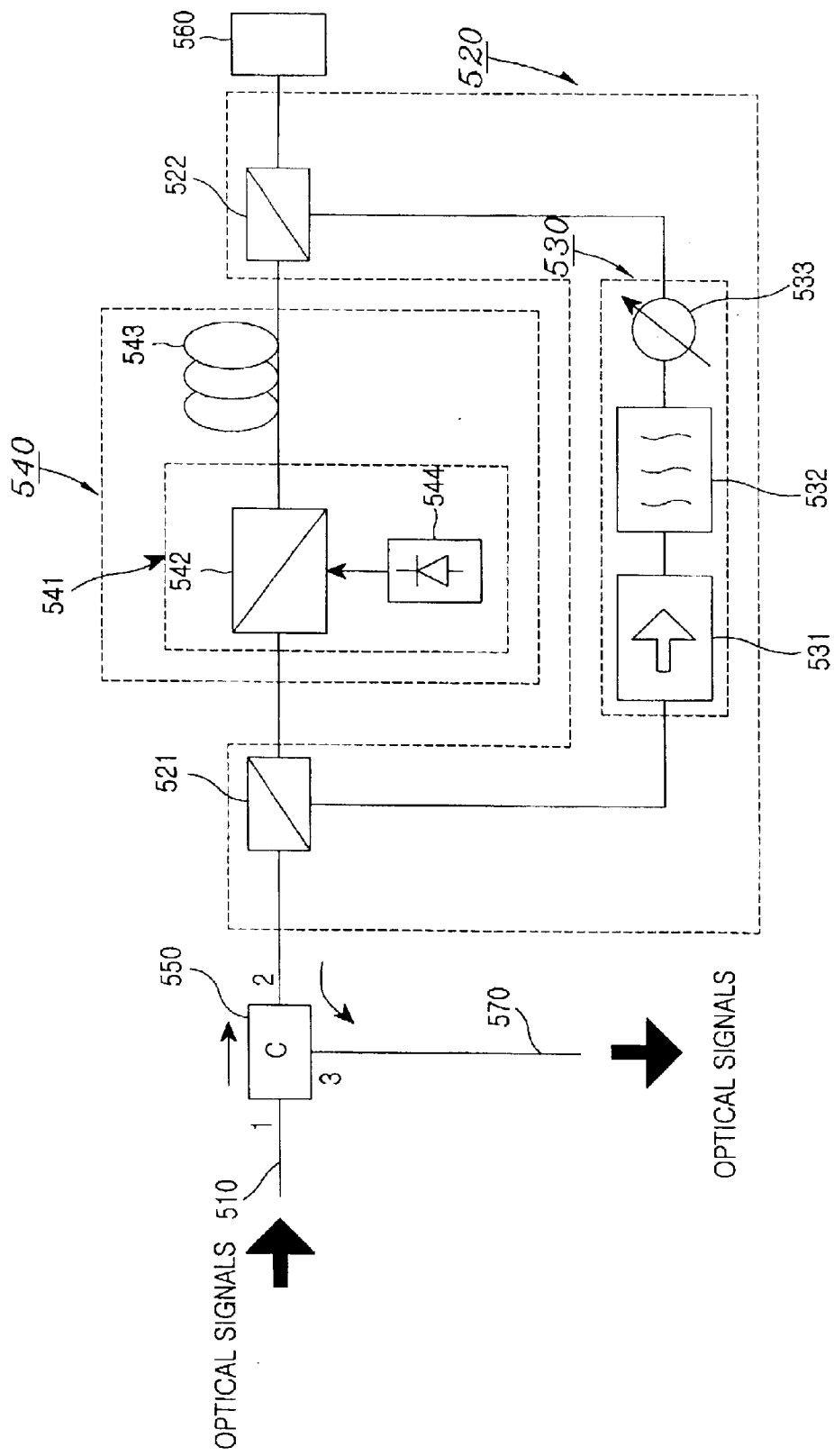
FIG. 5 shows a configuration of an L-band optical amplifier according to a second embodiment of the present invention, in which the L-band optical amplifier further comprises a controlling section for adjusting the wavelength band and the intensity of spontaneous emission; and, FIG. 6 shows a configuration of an L-band optical amplifier according to a third embodiment of the present invention, in which the L-band optical amplifier further comprises a front optical-amplifying section and a front isolator so as to pre-pump optical signals with the wavelength band of the L-band.

FIG. 5 shows a configuration of an L-band optical amplifier according to a second embodiment of the present invention, in which the L-band optical amplifier further comprises a controlling section for adjusting the wavelength band and intensity of spontaneous emission, as compared with that of FIG. 4. As shown in FIG. 5, the L-band optical amplifier includes a circulator 550, an optical-amplifying section 540, a mirror 560, a feedback loop 520, and a controlling section 530. The circulator 550 includes one port connected with an input terminal 510 into which optical signals with the wavelength band of the L-band are inputted, and another port connected with an output terminal 570 through which amplified optical signals are outputted.

The optical amplifying section 540 includes an erbium-doped fiber 543 for emitting spontaneous emission and for amplifying optical signals of the L-band, and a pumping means 541 for pumping the erbium-doped fiber 543. The optical-amplifying section 540 emits spontaneous emission and is pumped by the spontaneous emission, via a feedback loop, to amplify the optical signals of the L-band.

The pumping means 541 comprises a pumping light source 544 for pumping the erbium-doped fiber 543 and a third wavelength selective coupler 542 for causing pump light outputted from the pumping light source 544 and the optical signals of the L-band to be inputted into the erbium-doped fiber 543.

The pumping light source 544 may be constructed by using a laser diode-generating light in wavelength of 980 nm and outputs pump light for pumping the erbium-doped fiber 543. The third wavelength selective coupler 542 incidents (?) the pump light and the optical signals of the L-band into the erbium-doped fiber 543.

The erbium-doped fiber 543 emits spontaneous emission with the wavelength band of the C-band after being pumped by the pump light. The erbium-doped fiber 543 is pumped by the spontaneous emission, which is fed back through the feedback loop 520, and then amplifies the optical signals of the L-band.

The mirror 560 reflects the L-band optical signals amplified at the erbium-doped fiber 543 to re-enter back t to the erbium-doped fiber 543.

The feedback loop 520 comprises a first wavelength selective coupler 521 connected to one end of the erbium-doped fiber 543 and a second wavelength selective coupler 522 connected to the other end of the erbium-doped fiber 543.

The first wavelength selective coupler 521 is connected to one end of the erbium-doped fiber 543, i.e.—to one terminal of the optical amplifying section 540 which is provided with the erbium-doped fiber 543.

The second wavelength selective coupler 522 is connected to the other end of the erbium-doped fiber 543 and forms the feedback loop 520 for circulating the spontaneous emission together with the second wavelength selective coupler 522, thereby feeding the spontaneous emission emitted from the erbium-doped fiber 543 back to the erbium-doped fiber 543.

The circulator 550 is disposed in front of the first wavelength selective coupler 521 and connected with the input terminal 510 and the output terminal 570, thus inputting the L-band optical signals inputted from the input terminal 510 into an interior of the L-band optical amplifier, preferably into the optical-amplifying section 540. The circulator 550 also outputs optical signals amplified at the interior of the L-band optical amplifier, preferably at the optical-amplifying section 540, to the output terminal 570.

The controlling section 530 includes an isolator 531, a variable optical attenuator 533, and a tunable filter 532, all of which are provided on the feedback loop 520, and serves to adjust the wavelength band of the spontaneous emission and the intensity of the spontaneous emission.

The isolator 531 is disposed on the feedback loop 520, and has the isolation of backward spontaneous emission inputted from the second wavelength selective coupler 522. The tunable filter 532 is disposed at the rear of the isolator 531 and allows a predetermined wavelength band of all the wavelength bands of spontaneous emission inputted from the isolator 531 to pass through. The variable optical attenuator 533 is disposed between the tunable filter 532 and the second wavelength selective coupler 522 and serves to adjust the intensity of the spontaneous emission inputted from the tunable filter 532.

Figure 6:
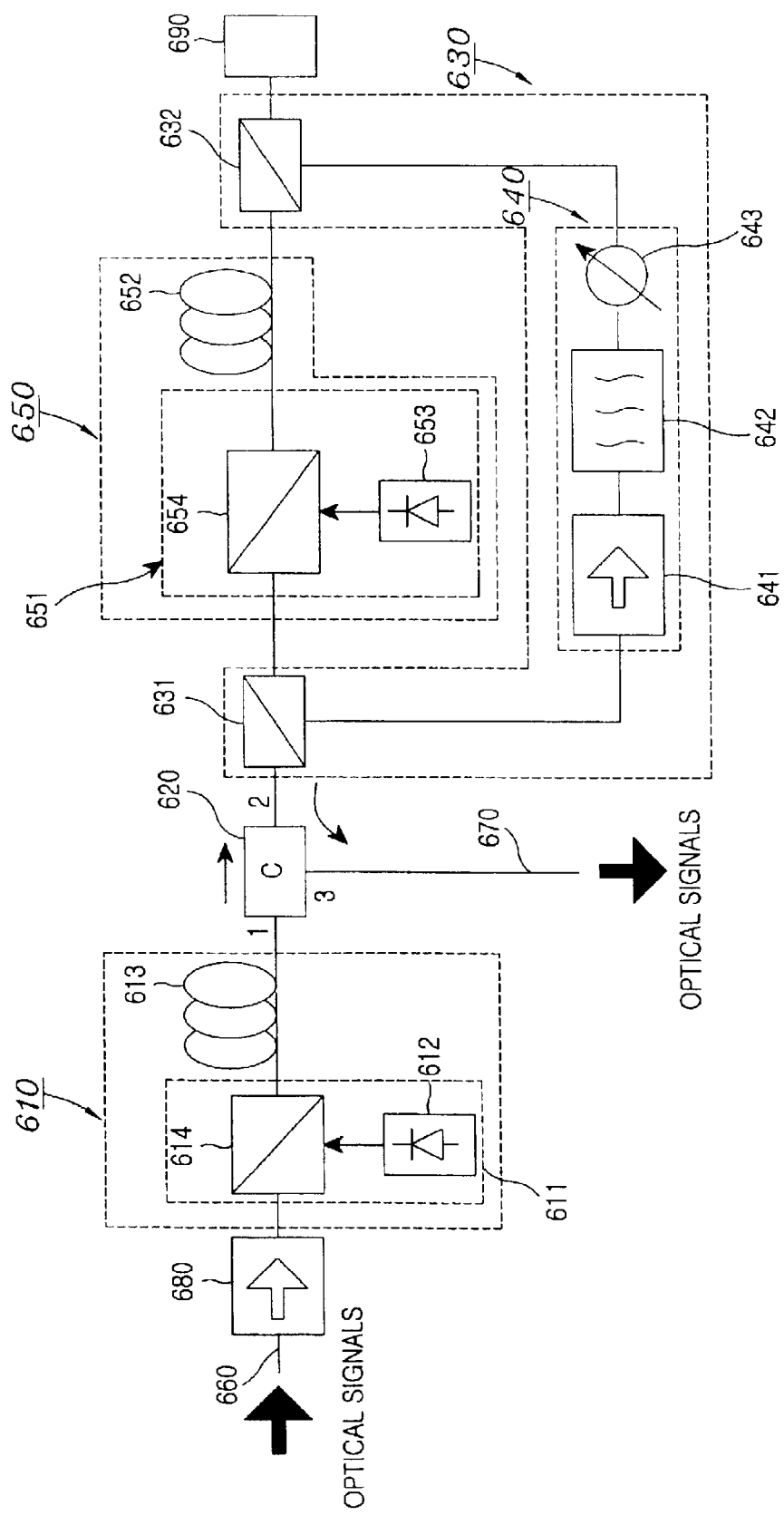

FIG. 6 shows a configuration of an L-band optical amplifier according to a third embodiment of the present invention, in which the L-band optical amplifier further comprises a front optical-amplifying section and a front isolator so as to pre-pump optical signals with the wavelength band of the L-band. As shown in FIG. 6, the L-band optical amplifier includes a circulator 620, an optical-amplifying section 650, a mirror 690, a feedback loop 630, a controlling section 640, a front optical-amplifying section 610, and a front isolator 680. The front isolator 680 is connected with an input terminal 660 into which optical signals with the wavelength band of the L-band are inputted, and the circulator 620 is connected with an output terminal 670 through which amplified optical signals are outputted.

The optical-amplifying section 650 includes an erbium-doped fiber 652 for emitting spontaneous emission to amplify optical signals of the L-band and a pumping means 651 for pumping the erbium-doped fiber 652. The optical-amplifying section 650 emits spontaneous emission and is pumped by the spontaneous emission, via a feedback loop, to amplify the optical signals of the L-band.

The pumping means 651 comprises a pumping light source 653 and a third wavelength selective coupler 654.

The pumping light source 653 may be constructed by using a laser diode-generating light in wavelength of 980 nm and outputs pump light for pumping the erbium-doped fiber 652. The third wavelength selective coupler 654 incidents the pump light and the optical signals of the L-band into the erbium-doped fiber 652.

The erbium-doped fiber 652 emits spontaneous emission with the wavelength band of the C-band after being pumped by the pump light. The erbium-doped fiber 652 is pumped by the spontaneous emission via a feedback loop to amplify the L-band optical signals. The mirror 690 reflects the L-band optical signals amplified at the erbium-doped fiber 652 to reenter the erbium-doped fiber 652.

The feedback loop 630 comprises a first wavelength selective coupler 631 connected to one end of the erbium-doped fiber 652 and a second wavelength selective coupler 632 connected to the other end of the erbium-doped fiber 652.

The first wavelength selective coupler 631 is connected to one end of the erbium-doped fiber 652, i.e.—to one terminal of the optical-amplifying section 650 which includes the erbium-doped fiber 652.

The second wavelength selective coupler 632 is connected to the other end of the erbium-doped fiber 652 and forms the feedback loop 630 for circulating the spontaneous emission together with the second wavelength selective coupler 632. The feedback loop 630 feeds the spontaneous emission emitted from the erbium-doped fiber 652 back to the erbium-doped fiber 652.

The circulator 620 is disposed between the feedback loop 630 and the front optical-amplifying section 610, thus inputting the L-band optical signals pre-amplified at the front optical-amplifying section 610 into the optical-amplifying section 650. The circulator 620 also outputs optical signals amplified at the optical-amplifying section 650 to the output terminal 570.

The controlling section 640 is provided on the feedback loop 630 and includes an isolator 641, a variable optical attenuator 643, and a tunable filter 642. The isolator 641 has the isolation of backward spontaneous emission inputted from the second wavelength selective coupler 632. The variable optical attenuator 643 adjusts the intensity of the spontaneous emission inputted from the tunable filter 642. The tunable filter 642 is disposed at the rear of the isolator 641 and allows a predetermined wavelength band of all the wavelength bands of spontaneous emission inputted from the isolator 641 to pass through.

The controlling section 640 is disposed on the feedback loop 630 and adjusts a wavelength band of spontaneous emission and an intensity of spontaneous emission.

The front optical-amplifying section 610 includes an erbium-doped fiber 613 and a pumping means 611 for pumping the erbium-doped fiber 613. The front optical-amplifying section 610 amplifies the L-band optical signals inputted through the input terminal 660 in advance.

The pumping means 611 comprises a wavelength selective coupler 614 and a pumping light source 611 so as to input the optical signals and the pump light into the front erbium-doped fiber.

The isolator 680 is disposed in front of the front optical-amplifying section 610 and has the isolation of backward optical signals inputted from the optical-amplifying section.

As can seen from the foregoing, the L-band optical amplifier according to the present invention comprises an optical-amplifying section with an erbium-doped fiber for emitting spontaneous emission and amplifying L-band optical signals, a feedback loop for feeding the spontaneous emission back to the erbium-doped fiber, and a mirror for reflecting the optical signals amplified at the optical-amplifying section. Using this configuration, the L-band optical signals can attain higher amplification efficiency using a short erbium-doped fiber and a small pump power.

What is claimed is:

1. An L-band optical amplifier for amplifying optical signals with the wavelength band of the L-band, comprising:
   an optical-amplifying section for emitting spontaneous emission and amplifying the optical signals;
   a mirror for reflecting the optical signals amplified by the optical-amplifying section back into the optical-amplifying section; and,
   a feedback loop coupled to both ends of the optical-amplifying section for directing the spontaneous emission emitted from the optical-amplifying section back to the optical-amplifying section.

2. The amplifier according to claim 1, further comprising a controlling section, disposed along the feedback loop, for adjusting the wavelength band and the intensity of the spontaneous emission passing there-through.

3. An L-band optical amplifier for amplifying optical signals with the wavelength band of the L-band, comprising:
   an erbium-doped fiber for emitting spontaneous emission and for amplifying the optical signals;
   a pumping means for pumping the erbium-doped fiber to generate the spontaneous emission;
   a mirror for reflecting the optical signals amplified by the erbium-doped fiber back to the erbium-doped fiber;
   a first wavelength selective coupler connected to one end of the erbium-doped fiber; and,
   a second wavelength selective coupler, connected to the other end of the erbium-doped fiber, for forming a feedback loop to cause the spontaneous emission emitted from the erbium-doped fiber to be fed back to the erbium-doped fiber.

4. The amplifier according to claim 3, further comprising:
- an isolator, disposed on the feedback loop, for preventing the backward spontaneous emission inputted from the second wavelength selective coupler;
- a tunable filter coupled to the isolator for allowing a predetermined wavelength band of the spontaneous emission inputted from the isolator to pass therethrough; and,
- a variable optical attenuator, disposed between the isolator and the tunable filter, for adjusting the intensity of the spontaneous emission received from the tunable filter.

5. The amplifier according to claim 3, further comprising a circulator, disposed in front of the first wavelength selective coupler, for forwarding the L-band optical signals inputted thereto to an input of the L-band optical amplifier output.

6. The amplifier according to claim 3, further comprising:
- a front optical-amplifying section for amplifying the L-band optical signals inputted to the L-band optical amplifier; and
- an isolator, disposed in front of the front optical-amplifying section, for preventing backward optical signals from the front optical-amplifying section to pass through.

7. The amplifier according to claim 6, wherein the front optical-amplifying section includes an erbium-doped fiber for amplifying the L-band optical signals and a pumping light source for outputting pump light so as to pump the erbium-doped fiber.

8. An L-band optical amplifier for amplifying optical signals with the wavelength band of the L-band, comprising:
- an optical amplifying section for amplifying optical signals;
- a mirror for reflecting the optical signals amplified by the optical-amplifying section back into the optical-amplifying section; and,
- a feedback loop coupled to both ends of the optical-amplifying section for directing spontaneous emission emitted from the output of the optical-amplifying section back to the input of the optical-amplifying section.

9. The amplifier according to claim 8, further comprising a controlling section provided along the feedback loop for adjusting the wavelength band and the intensity of the spontaneous emission passing there-through.

10. The amplifier according to claim 8, wherein the optical-amplifying sections comprises:
- an erbium-doped fiber for amplifying the optical signals;
- a pumping means for pumping the erbium-doped fiber to generate the spontaneous emission; and,
- a first wavelength selective coupler coupled to one end of the optical-amplifying section and a second wavelength selective coupler coupled to the other end of the optical-amplifying section, thus forming the feedback loop.

11. The amplifier according to claim 10, wherein the controlling section comprises:
- a tunable filter for allowing to pass a predetermined wavelength band of the spontaneous emission received therein;
- a variable optical attenuator coupled to the tunable filter for adjusting the intensity of the spontaneous emission outputted from the tunable filter; and,
- an isolator coupled to the variable optical attenuator for preventing backward spontaneous emission outputted from the variable optical attenuator.

12. The amplifier according to claim 8, further comprising:
- a front optical-amplifying section for amplifying the L-band optical signals inputted to the L-band optical amplifier; and,
- an isolator coupled in front of the front optical-amplifying section for preventing backward optical signals from the front optical-amplifying section to pass through.

13. The amplifier according to claim 12, wherein the front optical-amplifying section includes an erbium-doped fiber for amplifying the L-band optical signals and a pumping light source for outputting pump light to pump the erbium-doped fiber.

* * * * *